US012773056B2

(12) United States Patent
Kurachek

(10) Patent No.: US 12,773,056 B2
(45) Date of Patent: Oct. 27, 2026

(54) TRAINING CUTLERY HAVING FINGER PLACEMENT RECEPTACLES

(71) Applicant: Kinder Cutlery LLC, Eden Prairie, MN (US)

(72) Inventor: Sarah G. Kurachek, Eden Prairie, MN (US)

(73) Assignee: Kinder Cutlery LLC, Eden Prairie, MN (US)

( * ) Notice: Subject to any disclaimer, the term of this patent is extended or adjusted under 35 U.S.C. 154(b) by 211 days.

(21) Appl. No.: 18/710,356

(22) PCT Filed: Nov. 18, 2022

(86) PCT No.: PCT/US2022/050427
§ 371 (c)(1),
(2) Date: May 15, 2024

(87) PCT Pub. No.: WO2023/091677
PCT Pub. Date: May 25, 2023

(65) Prior Publication Data

US 2025/0017402 A1 Jan. 16, 2025

Related U.S. Application Data

(60) Provisional application No. 63/264,326, filed on Nov. 19, 2021.

(51) Int. Cl.
*A47G 21/08* (2006.01)
*A47G 21/02* (2006.01)
*B26B 3/02* (2006.01)

(52) U.S. Cl.
CPC ............ *A47G 21/08* (2013.01); *A47G 21/02* (2013.01); *B26B 3/02* (2013.01)

(58) Field of Classification Search
CPC ........... A47G 21/08; A47G 21/02; B26B 3/02
See application file for complete search history.

(56) References Cited

U.S. PATENT DOCUMENTS 2,115,686 A 4/1938 Zimmer
3,224,093 A * 12/1965 Huck .................... A47G 21/08 30/324

(Continued)

FOREIGN PATENT DOCUMENTS

DE 202007007068 U1 8/2007
GB 2512090 B 11/2015
WO 2011050408 A1 5/2011

OTHER PUBLICATIONS

Examination Report under Section 18(3) dated Mar. 7, 2025, for corresponding Great Britain Patent Application No. 2408521.9, 4 pgs.

(Continued)

*Primary Examiner* — Omar Flores Sanchez
(74) *Attorney, Agent, or Firm* — Kinney & Lange, P.A.

(57) ABSTRACT

An example utensil includes a handle and a head portion. The handle includes a grip portion, a neck portion, a finger receptacle, and a finger stop. A finger receptacle is disposed on aback side of the utensil and at least partially defines a passage extending between an entry opening oriented toward a proximal end of the utensil and an exit opening oriented toward a distal end of the utensil opposite the proximal end. The passage is configured to receive and circumscribe a tip of a finger of a hand holding the handle. The finger stop is disposed on the back side of the utensil on an opposite axial side of the finger receptacle from the grip. The head portion extends in the first axial direction from the neck portion and is disposed axially between the finger receptacle and the head portion. The head portion is configured to engage food.

17 Claims, 7 Drawing Sheets

(56) References Cited

U.S. PATENT DOCUMENTS

| | | | | |
|---|---|---|---|---|
| 4,261,608 | A * | 4/1981 | Bradshaw | A47G 21/103 294/99.2 |
| 5,310,345 | A | 5/1994 | Gershon | |
| 5,373,643 | A * | 12/1994 | Warren | A47G 21/02 30/340 |
| 5,791,705 | A * | 8/1998 | Romero | A61F 4/00 30/298 |
| 5,975,909 | A | 11/1999 | Ritchie | |
| 6,895,639 | B1 | 5/2005 | Bayton | |
| 8,616,098 | B1 * | 12/2013 | Rosow | B25G 1/102 81/489 |
| 11,641,962 | B1 * | 5/2023 | Foxx | A47G 21/08 30/123 |
| 2005/0241111 | A1 | 11/2005 | Prokop | |
| 2006/0014009 | A1 | 1/2006 | Weidner | |
| 2007/0197066 | A1 | 8/2007 | Chang | |
| 2008/0014009 | A1 | 1/2008 | Bush et al. | |
| 2010/0050439 | A1 * | 3/2010 | Wedderburn | B67D 7/048 15/236.01 |
| 2011/0003273 | A1 | 1/2011 | Roggensack | |
| 2012/0324741 | A1 * | 12/2012 | Pookrum | A47G 21/02 30/340 |
| 2015/0265081 | A1 * | 9/2015 | Parks | B26B 3/02 30/295 |
| 2016/0358512 | A1 | 12/2016 | Gonshor | |
| 2017/0215613 | A1 | 8/2017 | Stein | |
| 2017/0341460 | A1 | 11/2017 | Estes | |
| 2018/0168379 | A1 * | 6/2018 | Delaforce | B26B 27/007 |
| 2020/0170428 | A1 * | 6/2020 | Stevenson | A47G 21/023 |
| 2025/0064237 | A1 * | 2/2025 | Peterson | A47G 21/02 |

OTHER PUBLICATIONS

International Preliminary Report on Patentability for PCT Application No. PCT/US2022/050427, Dated May 30, 2024, pp. 8.

International Search Report and Written Opinion for International Application No. PCT/US22/50427, dated Feb. 27, 2023, 9 pages.

First Office Action dated Oct. 25, 2024, for corresponding GB Patent Application No. 2408521.9, 4 pgs.

Intention to Grant dated Jul. 7, 2025, for corresponding British Patent Application No. GB2408521.9, 2 pgs.

* cited by examiner

TRAINING CUTLERY HAVING FINGER PLACEMENT RECEPTACLES

CROSS-REFERENCE TO RELATED APPLICATION

This application claims the benefit of U.S. Provisional Application No. 63/264,326 filed Nov. 19, 2021, entitled "TRAINING CUTLERY HAVING FINGER PLACEMENT RECEPTACLES" by Sarah Kurachek, the entire contents of which are hereby incorporated by reference.

BACKGROUND

The present disclosure relates generally to cutlery, and in particular to improved etiquette training utensils.

Cutlery broadly includes knives, forks, spoons, and other utensils used to consume food. The use of these utensils follows conventions regarding eating techniques that can be geographically particular. In the "American" technique, typically, the knife is held in the dominant hand and the fork in the non-dominant hand while cutting food. While eating, the knife is placed on the plate and the fork is held in the dominant hand. According to the "Continental" or European technique, however, the knife is typically kept in the dominant hand and the fork is kept in the non-dominant hand both while eating and while cutting. Teaching proper utensil etiquette can be difficult and time consuming.

SUMMARY

A utensil includes a handle and a head portion. The handle includes a grip portion, a neck portion, a finger receptacle, and a finger stop. The handle extends along a utensil axis from a proximal end of the utensil. The grip portion of the handle extends in a first axial direction along the utensil axis from the proximal end. The neck portion extends in the first axial direction from the grip. The finger receptacle is disposed on a back side of the utensil and at least partially defines a passage extending between an entry opening oriented toward the proximal end of the utensil and an exit opening oriented toward a distal end of the utensil opposite the proximal end. The passage is configured to receive and circumscribe a tip of a finger of a hand holding the handle. The finger stop is disposed on the back side of the utensil on an opposite axial side of the finger receptacle from the grip. The head portion extends in the first axial direction from the neck portion such that the finger stop is disposed axially between the finger receptacle and the head portion. The head portion is configured to engage food.

DETAILED DESCRIPTION

This disclosure presents a utensil with intuitive design to allow a user, such as a child, to learn proper cutlery usage and etiquette for themselves, thereby reducing the burden of teaching this skill. This intuitive design constrains finger placement while holding the utensil, thereby discouraging any improper grip, and facilitating proper usage of the utensil. With this intuitive design, the shape of the utensil itself guides user grip and operation of the utensil to build appropriate habits as to etiquette of the use of the utensil.

Figure 1A:
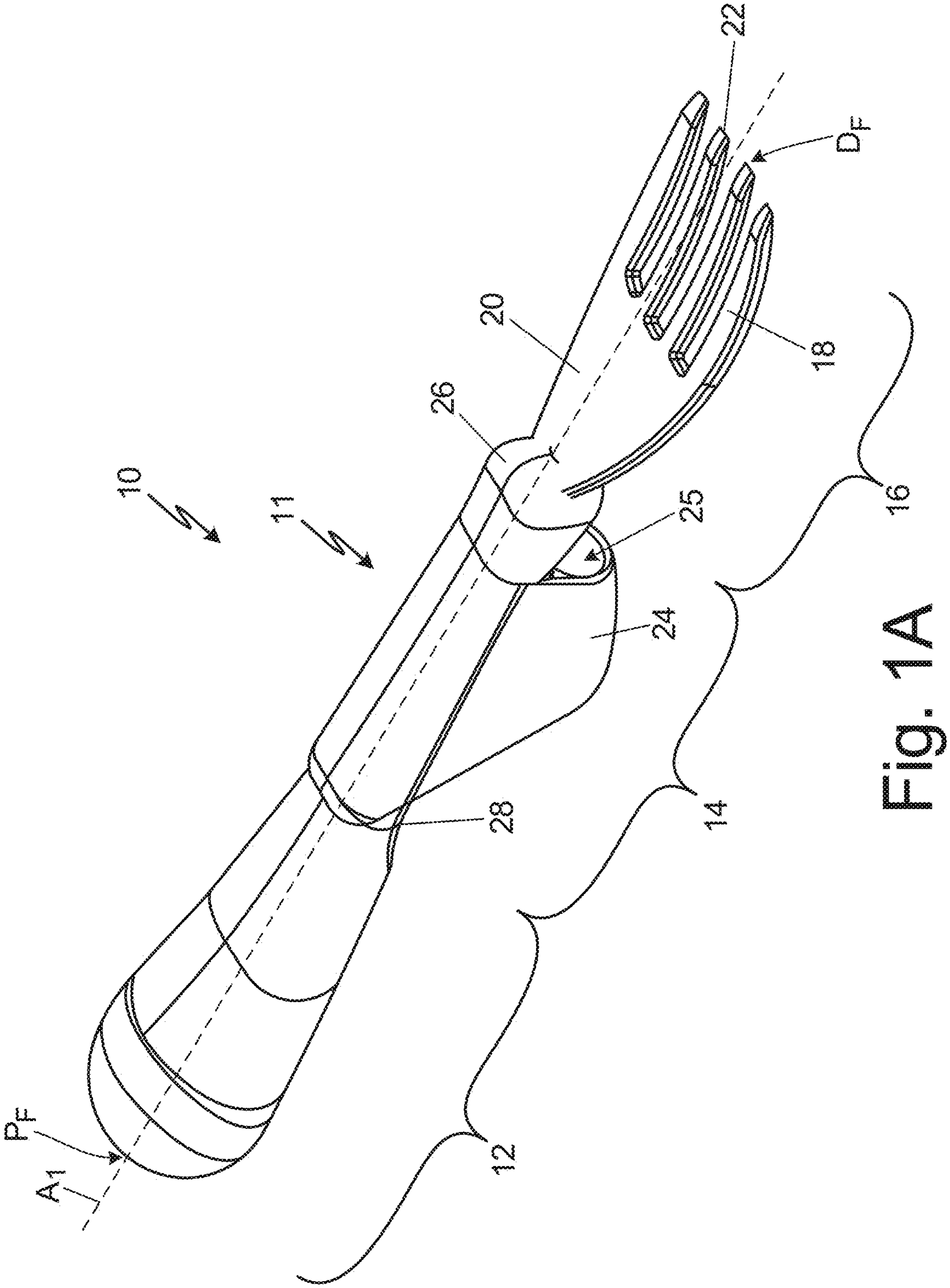
FIG. 1A is a perspective view of a fork utensil.
Figure 1B:
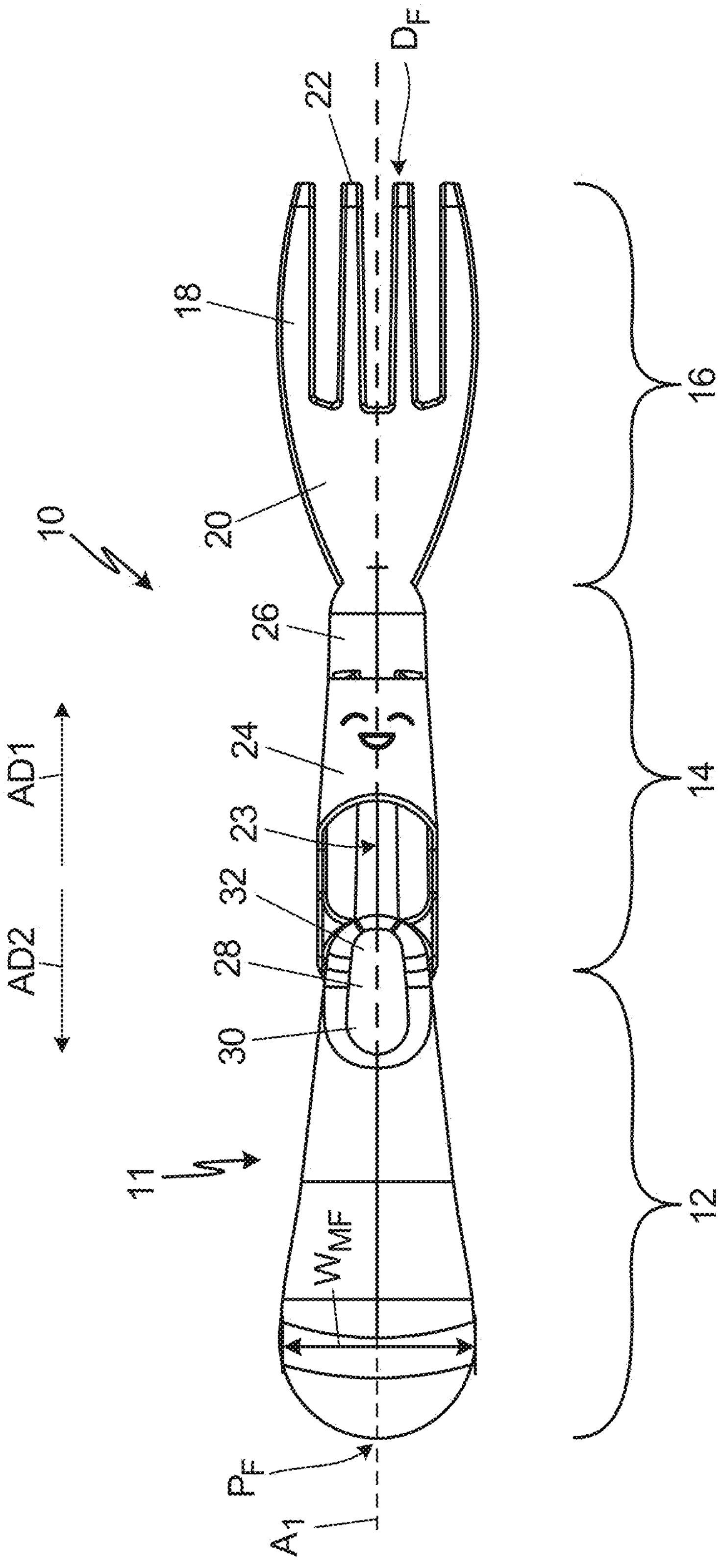
FIG. 1B is a bottom view of the fork utensil.
Figure 1C:
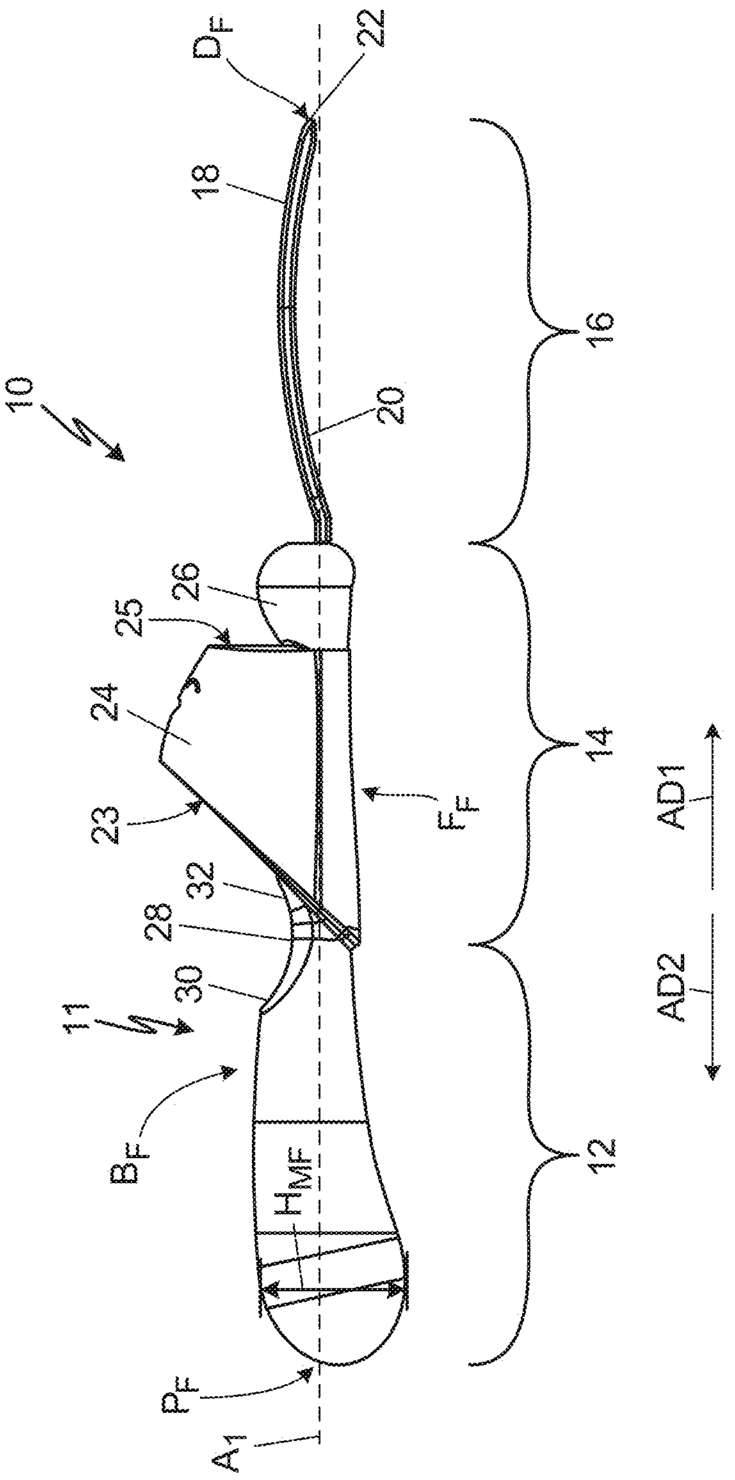
FIG. 1C is a side view of the fork utensil.

FIGS. 1A-1C present various views of a fork utensil for etiquette training. FIG. 1A is a perspective view of fork 10. FIG. 1B is a bottom view of fork 10. FIG. 1C is a side view of fork 10. FIGS. 1A-1C will be discussed here together.

Fork 10 includes handle 11 and head portion 16. Handle 11 includes grip portion 12 and neck portion 14. Head portion 16 includes tines 18, root 20, and points 22. Fork 10 further includes entry opening 23, finger receptacle 24, exit opening 25, finger stop 26, and recessed portion 28. Recessed portion 28 is defined by first shoulder 30 (shown in FIGS. 1B and 1C) and second shoulder 32 (shown in FIGS. 1B and 1C).

As illustrated in FIGS. 1A-1C, grip portion 12, neck portion 14, and head portion 16 are generally axially aligned along utensil axis $A_1$. The terms proximal and distal are used herein to mean closer to a user during use of the utensil (proximal) and further from the user during use of the utensil (distal). Accordingly, the illustrated end of handle 11 that is closest to the user during use of fork 10 forms proximal end $P_F$ of fork 10, while the end of points 22 together form distal end $D_F$ of fork 10. Handle 11, including grip portion 12 and neck portion 14, extends along utensil axis $A_1$ in first axial direction AD1 from proximal end $P_F$. Grip portion 12 generally tapers from a location of a maximum width $W_{MF}$ (shown in FIG. 1B) along utensil axis $A_1$ as grip portion 12 extends in first axial direction AD1 toward neck portion 14. Grip portion 12 generally tapers from a location of a maximum height $H_{MF}$ (shown in FIG. 1C) along utensil axis $A_1$ as grip portion 12 extends in first axial direction AD1 toward neck portion 14. Grip portion 12, as illustrated in FIGS. 1A-1C, can have a generally circular, oval, or other curved cross-section.

Maximum width $W_{MF}$ and maximum height $H_{MF}$, in some examples, can each be within a range from 0.75 inches (1.905 centimeters) to 1.25 inches (3.175 centimeters). Accordingly, maximum width $W_{MF}$ and maximum height $H_{MF}$ of grip portion 12, which are wider than a width and height of neck portion 14, can provide a robust gripping surface that is easily grasped by an inexperienced user of utensils (e.g., a child), thereby improving the user's ability to hold and confidently manipulate fork 10 during use. As such, grip portion 12 of handle 11 can provide enhanced training benefits as compared to the handles of traditional utensils, which typically are narrower in both width and height than fork 10 and can be harder for a young or otherwise inexperienced user to grasp and manipulate.

As illustrated in FIGS. 1A-1C, grip portion 12 tapers in width and height from the location of maximum width $W_{MF}$ and maximum height $H_{MF}$ to neck portion 14. Neck portion 14 is directly connected to and extends from grip portion 12 along utensil axis $A_1$ in first axial direction AD1 to head portion 16. Neck portion 14, as illustrated, has a maximum width and height that is less than maximum width $W_{MF}$ and maximum height $H_{MF}$ of grip portion 12. The narrower height and width of neck portion 14 (relative to grip portion 12) can enable a user to manipulate the utensil (i.e., fork 10 in the example of FIGS. 1A-1C) during use while also training the user to handle traditional utensils that often narrow near the interface of the neck portion with the head portion of the utensil.

Neck portion 14, as illustrated in FIGS. 1A-1C, includes finger receptacle 24. Finger receptacle 24 is disposed on back side $B_F$ of fork 10 (illustrated in FIG. 1C) and is configured to retain and circumscribe a tip of a finger of a user holding fork 10 (generally, the index finger of the user). As illustrated in FIGS. 1A-1C, finger receptacle 24 can define a passage extending between entry opening 23 oriented toward proximal end $P_F$ and exit opening 25 oriented toward distal end $D_F$ of fork 10. The passage is configured to receive and circumscribe a tip of a finger of a hand holding handle 11. During use, the tip of the finger of the user is inserted through entry opening 23 when first grasping handle 11 and exits through exit opening 25 to finger stop 26, as is further described below.

Entry opening 23 and exit opening 25 of finger receptacle 24 can facilitate cleaning of fork 10 in the case that food or other debris gathers within finger receptacle 24. Moreover, openings 23 and 25 on both proximal and distal ends of finger receptacle 24 (i.e., entry opening 23 and exit opening 25, respectively) can help to discourage the collection of food within finger receptacle 24 during use by providing a pathway for food to exit, thereby improving comfort of the user during use of fork 10 and decreasing the chance that fork 10 will require cleaning during use (e.g., during a meal) and interrupting the use and training of the user while eating. In other examples, finger receptacle 24 need not include exit opening 25. For instance, in some examples, the distal end of finger receptacle 24 can be webbed or otherwise partially open to facilitate cleaning of the fork 10 while also providing an end point for the tip of the finger of the user to contact during use. In yet other examples, the distal end of finger receptacle 24 can be closed, thereby preventing ingress of food during use of fork 10.

In some examples, such as the example of FIGS. 1A-1C, finger receptacle 24 is generally frustoconical in shape, though in other examples, finger receptacle 24 can be generally cylindrical in shape. In the example of FIGS. 1A-1C, the generally frustoconical shape of finger receptacle 24 results in an area of entry opening 23 that is greater than an area of exit opening 25. For instance, as illustrated in FIGS. 1B and 1C, entry opening 23 can have an area that is greater than an area of exit opening 25 and is slanted in first axial direction AD1 toward distal end $D_F$ of fork 10. Exit opening 25, as illustrated in FIGS. 1B and 1C, can have an area that is less than the area of entry opening 23, and can be perpendicular to utensil axis A1.

This frustoconical shape of finger receptacle 24 as illustrated in FIGS. 1A-1C can help to guide the user's finger toward finger stop 26 of neck portion 14. Finger receptacle 24, by circumscribing the tip of the user's finger, constrains hand and finger placement to promote proper usage by the user when gripping fork 10 during use. Moreover, by circumscribing the tip of the user's finger (e.g., rather than merely providing a finger placement position or other visual or haptic indication for finger placement without circumscribing and retaining the fingertip), finger receptacle 24 also helps to provide a more secure grip on the utensil while manipulating the utensil during use and, in the case of fork 10, while moving the utensil from plate to mouth.

The location of finger receptacle 24 on back side $B_F$ of fork 10 serves to promote proper placement of the user's finger according to common etiquette. That is, there are two commonly used fashions of cutlery usage for knives and forks: the American fashion; and the Continental fashion. The American fashion of cutlery usage can be defined by two states: cutting; and eating. When the user is cutting according to the American fashion, the knife is typically held in the dominant hand and the fork (e.g., fork 10) is held in the non-dominant hand. However, when eating with the American fashion, the knife is placed on the plate and the fork is gripped in the dominant hand. The Continental fashion of cutlery usage differs from the American fashion, in that the knife is kept in the dominant hand and the fork is kept in the non-dominant hand both while eating and while cutting. In either fashion, the fork (e.g., fork 10) is held in the non-dominant hand while cutting. The location of finger receptacle 24 on back side $B_F$ of fork 10 encourages not only the proper placement of the user's finger (e.g., index finger) during cutting (and eating in the Continental fashion), but also the proper orientation of fork 10 such that front side $F_F$ of fork 10, opposite back side $B_F$, faces the plate and orients tines 18 toward the food. Accordingly, finger receptacle 24 encourages proper placement of the user's finger on fork 10 while eating and circumscribes the tip of the finger to provide an intuitive guide for finger placement and increased grip on fork 10 during use.

As illustrated in FIGS. 1A-1C, fork 10 also includes recessed portion 28 formed in back side $B_F$ of fork 10. Recessed portion 28 is formed as a depression or other narrowing in back side $B_F$, and is defined by first shoulder 30 and second shoulder 32 (shown in FIGS. 1B and 1C). Shoulders 30 and 32, while illustrated as having a rounded contour, can be straight or otherwise less rounded in some examples, though the rounded contour of the example of FIGS. 1A-1C provides an ergonomic and comfortable resting location for the user's finger. Recessed portion 28, formed in back side $B_F$ of fork 10, provides a natural resting location for the middle finger of the user during use for eating in the American etiquette fashion, as is further illustrated and described with respect to FIG. 3B. Accordingly, a length of recessed portion 28 along utensil axis $A_1$ from first shoulder 30 to second shoulder 32 can be configured to accommodate a typical width of a user's finger, such as a length from first shoulder 30 and second shoulder 32 of between 0.5 inches (1.27 centimeters) and 1.0 inches (2.54 centimeters), in some examples.

Recessed portion 28 can be formed in back side $B_F$ at the transition between grip portion 12 and neck portion 14. For instance, as illustrated in FIGS. 1B and 1C, first shoulder 30 can be formed in grip portion 12 and second shoulder 32 can be formed in neck portion 14, such that recessed portion 28 straddles the transition between grip portion 12 and neck portion 14. In such examples, the location of recessed portion 28 can encourage proper location of the middle finger of the user at generally a mid-point between proximal end $P_F$ and distal end $D_F$ along utensil axis $A_1$ while eating in the American fashion. Recessed portion 28 therefore provides a visual and haptic guide to the user towards placement of the middle finger in the correct location while eating in the American fashion, which is part of the intuitive design of fork 10.

Neck portion 14, as illustrated in FIGS. 1A-1C, also includes finger stop 26. Finger stop 26 is formed as a raised portion on back side $B_F$ of fork 10 at a distal end of neck portion 14 on an opposite axial side of finger receptacle 24 from grip portion 12. Finger stop 26, in some examples, can be disposed immediately adjacent to exit opening 25 of finger receptacle 24, thereby providing a contact surface for the end of the tip of the user's finger when inserted into finger receptacle 24 to prevent the user's finger from sliding through finger receptacle 24 beyond neck portion 14.

Finger stop 26, being formed by an increase in height of neck portion 14 between front side $F_F$ and back side $B_F$ relative to a height of neck portion 14 (i.e., between front side $F_F$ and back side $B_F$) at a distal end of finger receptacle 24, thereby extends radially outward (i.e., relative to utensil axis $A_1$) to at least partially radially overlap exit opening 25. That is, finger stop 26 radially overlaps at least a portion of exit opening 25, such that there exists at least one theoretical line that extends parallel to utensil axis $A_1$ through entry opening 23 and exit opening 25 that intersects finger stop 26. In some examples, such as the illustrated example of FIGS. 1A-1C, a height difference as measured from a top surface of finger stop 26 to a top of finger receptacle 24 at a distal end of finger receptacle 24 can be less than half of a height from the top surface of finger receptacle 24 at the distal end of finger receptacle 24 to the top surface of neck portion 14 at the distal end of finger receptacle 24. Put another way, finger stop 26 can block more than half of exit opening 25 in some examples, thereby helping to prevent the tip of the user's finger from moving beyond finger stop 26 to head portion 16.

As such, finger stop 26 promotes proper placement of the tip of the finger of the user at a distal end of neck portion 14 near a proximal end of head portion 16 when cutting in either the American or Continental fashions, and when eating in the Continental fashion. Moreover, the frustoconical shape of finger receptacle 24, having an angled upper surface that is oriented toward finger stop 26, helps to urge the tip of the user's finger toward finger stop 26, thereby naturally forming a pressure location between the fingertip and the distal end of neck portion 14 to further encourage proper placement of the finger when using fork 10.

Head portion 16, as illustrated in FIGS. 1A-1C, includes multiple tines 18 that each extend in first axial direction AD1 from root 20 to a respective point 22 at distal end $D_F$ of fork 10. Head portion 16 is connected to and extends in a proximal direction along utensil axis $A_1$ from a distal end of neck portion 14 to form distal end $D_F$ of fork 10. Tines 18, as illustrated in FIGS. 1A and 1C, curve concavely toward front side $F_F$ of fork 10. Although head portion 16 is depicted as having four tines 18, head portion 16 can more generally include any number of two or more tines 18. Root 20 connects each of tines 18, and is itself connected to a distal end of neck portion 14, such that root 20 is immediately adject to a distal side of finger stop 26.

Accordingly, fork 10 is an example training utensil with intuitive design that constrains finger placement while holding the utensil, thereby discouraging improper grip and facilitating proper usage of the utensil. With this intuitive design, the shape and features of fork 10 itself guides user grip and operation of fork 10 to build appropriate habits as to etiquette of the use of the utensil. This intuitive design allows the user to learn proper cutlery usage and etiquette for themselves, thereby reducing the burden of teaching this skill.

Figure 2A:
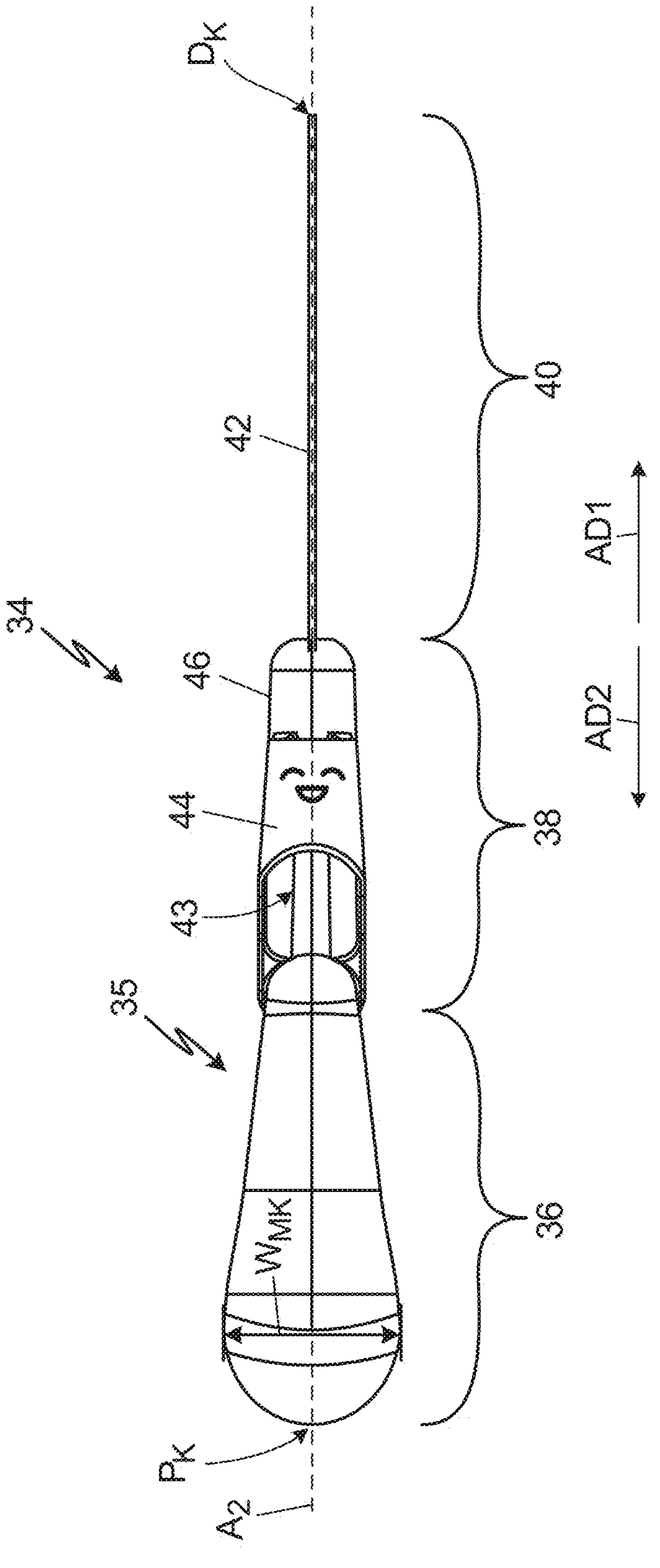
FIG. 2A is a top view of a knife utensil.
Figure 2B:
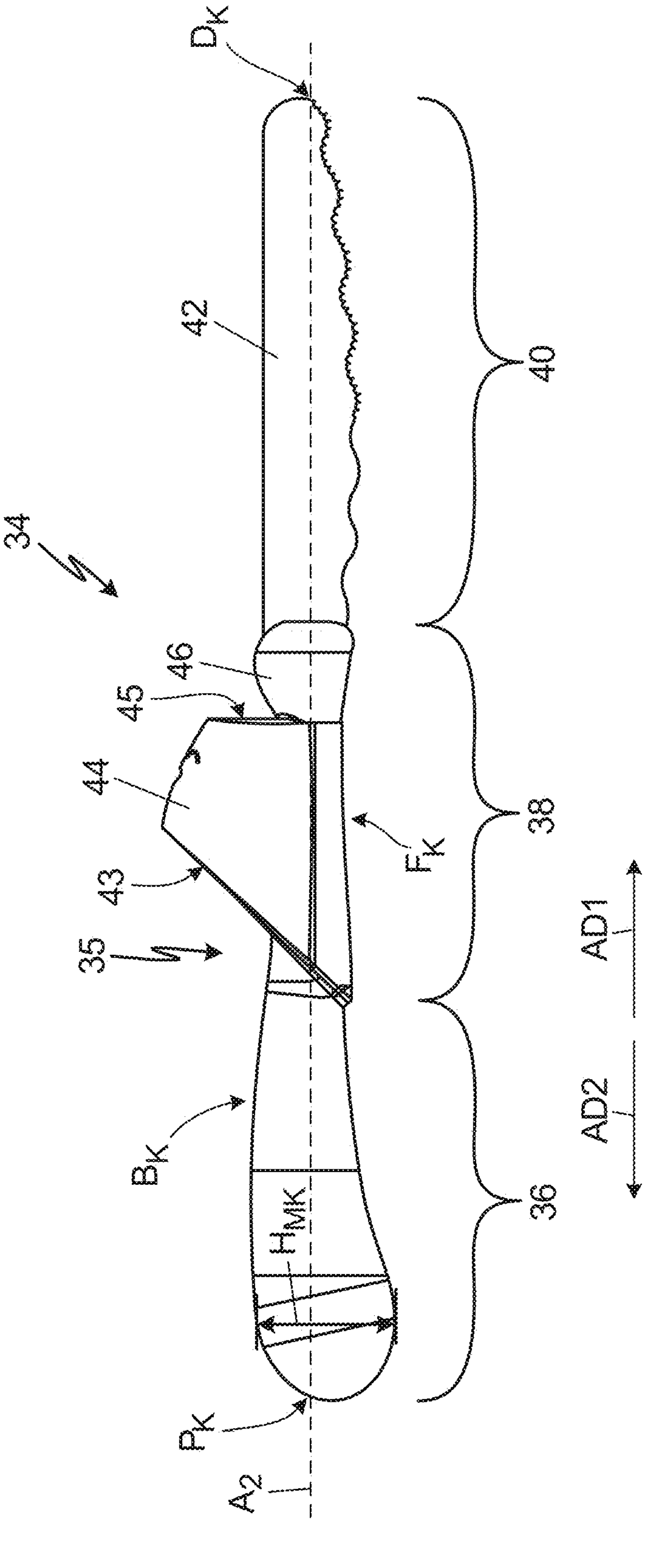
FIG. 2B is a side view of the knife utensil.

FIG. 2A is a top view of knife 34 having an intuitive design that can be used for etiquette training. FIG. 2B is a side view of knife 34. FIGS. 2A and 2B will be discussed here together.

Knife 34 includes handle 35 and head portion 40. Handle 35 includes grip portion 36 and neck portion 38. Head portion 40 includes blade 42. Knife 34 further includes finger receptacle 44 and finger stop 46.

As illustrated in FIGS. 2A and 2B, grip portion 36, neck portion 38, and head portion 40 are generally axially aligned along utensil axis $A_2$. The illustrated end of handle 35 that is closest to the user during use of knife 34 forms proximal end $P_K$ of knife 34, while the end of blade 42 forms distal end $D_K$ of knife 34. Handle 35, including grip portion 36 and neck portion 38, extends along utensil axis $A_2$ in first axial direction AD1 from proximal end $P_K$. Grip portion 36 tapers from a location of a maximum width $W_{MK}$ (shown in FIG. 2A) 36 along utensil axis $A_2$ as grip portion 36 extends in first axial direction AD1 toward neck portion 38. Grip portion 36 generally tapers from a location of a maximum height $H_{MK}$ (shown in FIG. 2B) along utensil axis $A_2$ as grip portion 36 extends in first axial direction AD1 toward neck portion 38. Grip portion 36, as illustrated in FIGS. 2A and 2B, can have a generally circular, oval, or other curved cross-section.

Maximum width $W_{MK}$ and maximum height $H_{MK}$, in some examples, can each be within a range from 0.75 inches (1.905 centimeters) to 1.25 inches (3.175 centimeters). Accordingly, maximum width $W_{MK}$ and maximum height $H_{MK}$ of grip portion 36, which are wider than a width and height of neck portion 38, can provide a robust gripping surface that is easily grasped by an inexperienced user of utensils (e.g., a child), thereby improving the user's ability to hold and confidently manipulate knife 34 during use. As such, grip portion 36 of handle 35 can provide enhanced training benefits as compared to the handles of traditional utensils, which typically are narrower in both width and height than knife 34 and can be harder for a young or otherwise inexperienced user to grasp and manipulate.

As illustrated in FIGS. 2A and 2B, grip portion 36 tapers in width and height from the location of maximum width $W_{MK}$ and maximum height $H_{MK}$ to neck portion 38. Neck portion 38 is directly connected to and extends from grip portion 36 along utensil axis $A_2$ in first axial direction AD1 to head portion 40. Neck portion 38, as illustrated, has a maximum width and height that is less than maximum width $W_{MK}$ and maximum height $H_{MK}$ of grip portion 36. The narrower height and width of neck portion 38 (relative to grip portion 36) can enable a user to manipulate the utensil (i.e., knife 34 in the example of FIGS. 2A and 2B) during use while also training the user to handle traditional utensils that often narrow near the interface of the neck portion with the head portion of the utensil.

Neck portion 38, as illustrated in FIGS. 2A and 2B, includes finger receptacle 44. Finger receptacle 44 is disposed on back side $B_K$ of knife 24 (illustrated in FIG. 2B) and is configured to retain and circumscribe a tip of a finger of a user holding knife 34 (generally, the index finger of the user). As illustrated in FIGS. 2A and 2B, finger receptacle 44 can define a passage extending between entry opening 43 oriented toward proximal end $P_K$ and exit opening 45 oriented toward distal end $D_K$ of fork 10. The passage is configured to receive and circumscribe a tip of a finger of a hand holding handle 35. During use, the tip of the finger of the user is inserted through entry opening 43 when first grasping handle 35 and exits through exit opening 45 to finger stop 46, as is further described below.

Entry opening 43 and exit opening 45 of finger receptacle 44 can facilitate cleaning of knife 34 in the case that food or other debris gathers within finger receptacle 44. Moreover, openings 43 and 45 on both proximal and distal ends of finger receptacle 44 (i.e., entry opening 43 and exit opening 45, respectively) can help to discourage the collection of food within finger receptacle 44 during use by providing a pathway for food to exit, thereby improving comfort of the user during use of knife 34 and decreasing the chance that knife 34 will require cleaning during use (e.g., during a meal) and interrupting the use and training of the user while eating. In other examples, finger receptacle 44 need not include exit opening 45. For instance, in some examples, the distal end of finger receptacle 44 can be webbed or otherwise partially open to facilitate cleaning of the knife 34 while also providing an end point for the tip of the finger of the user to contact during use. In yet other examples, the distal end of finger receptacle 44 can be closed, thereby preventing ingress of food during use of knife 34.

In some examples, such as the example of FIGS. 2A and 2B, finger receptacle 44 is generally frustoconical in shape, though in other examples, finger receptacle 44 can be generally cylindrical in shape. In the example of FIGS. 2A and 2B, the generally frustoconical shape of finger receptacle 44 results in an area of entry opening 43 that is greater than an area of exit opening 45. For instance, as illustrated in FIG. 2B, entry opening 43 can have an area that is greater than an area of exit opening 45 and is slanted in first axial direction AD1 toward distal end $D_K$ of knife 34. Exit opening 45, as illustrated in FIG. 2B, can have an area that is less than the area of entry opening 43, and can be perpendicular to utensil axis A1.

This frustoconical shape of finger receptacle 44 as illustrated in FIG. 2B can help to guide the user's finger toward finger stop 46 of neck portion 38. Finger receptacle 44, by circumscribing the tip of the user's finger, constrains hand and finger placement to promote proper usage by the user when gripping knife 34 during use. Moreover, by circumscribing the tip of the user's finger (e.g., rather than merely providing a finger placement position or other visual or haptic indication for finger placement without circumscribing and retaining the fingertip), finger receptacle 44 also helps to provide a more secure grip on the utensil while manipulating the utensil during use.

The location of finger receptacle 44 on back side $B_K$ of knife 34 serves to promote proper placement of the user's finger according to common etiquette. The location of finger receptacle 44 on back side $B_K$ of knife 34 encourages not only the proper placement of the user's finger (e.g., index finger) during cutting, but also the proper orientation of knife 34 such that front side $F_K$ of knife 34, opposite back side $B_K$, faces the plate and orients the edge side of blade 42 toward the food. Accordingly, finger receptacle 44 encourages proper placement of the user's finger on knife 34 while eating and circumscribes the tip of the finger to provide an intuitive guide for finger placement and increased grip on knife 34 during use.

As illustrated in FIGS. 2A and 2B, unlike fork 10 described above, knife 34 does not include a recessed portion formed in back side $B_K$ of knife 34, as knife 34 is not inverted and held in the non-dominant hand in either the American or Continental fashions of etiquette. The absence of the recessed portion in knife 34 can facilitate training of proper use of knife 34 by not providing an indication to an inexperienced user that knife 34 should be inverted and used by the opposite hand, thereby contributing to the intuitive design of knife 34 and further decreasing the efforts required for training of an inexperienced user.

Neck portion 14, as illustrated in FIGS. 2A and 2B, also includes finger stop 46. Finger stop 46 is formed as a raised portion on back side $B_K$ of knife 34 at a distal end of neck portion 38 on an opposite axial side of finger receptacle 44 from grip portion 36. Finger stop 46, in some examples, can be disposed immediately adjacent to exit opening 45 of finger receptacle 44, thereby providing a contact surface for the end of the tip of the user's finger when inserted into finger receptacle 44 to prevent the user's finger from sliding through finger receptacle 44 beyond neck portion 38.

Finger stop 46, being formed by an increase in height of neck portion 38 between front side $F_K$ and back side $B_K$ relative to a height of neck portion 38 (i.e., between front side $F_K$ and back side $B_K$) at a distal end of finger receptacle 44, thereby extends radially outward (i.e., relative to utensil axis $A_2$) to at least partially radially overlap exit opening 45. That is, finger stop 46 radially overlaps at least a portion of exit opening 45, such that there exists at least one theoretical line that extends parallel to utensil axis $A_2$ through entry opening 43 and exit opening 45 that intersects finger stop 46. In some examples, such as the illustrated example of FIGS. 2A and 2B, a height difference as measured from a top surface of finger stop 46 to a top of finger receptacle 44 at a distal end of finger receptacle 44 can be less than half of a height from the top surface of finger receptacle 44 at the distal end of finger receptacle 24 to the top surface of neck portion 38 at the distal end of finger receptacle 44. Put another way, finger stop 46 can block more than half of exit opening 45 in some examples, thereby helping to prevent the tip of the user's finger from moving beyond finger stop 46 to head portion 40.

As such, finger stop 46 promotes proper placement of the tip of the finger of the user at a distal end of neck portion 38 near a proximal end of head portion 40 when cutting in either the American or Continental fashions. Moreover, the frustoconical shape of finger receptacle 24, having an angled upper surface that is oriented toward finger stop 46, helps to urge the tip of the user's finger toward finger stop 46, thereby naturally forming a pressure location between the fingertip and the distal end of neck portion 38 to further encourage proper placement of the finger when using knife 34.

Head portion 40, in the example of FIGS. 2A and 2B, is formed by blade 42 having a cutting edge at front side $F_K$ and a blunt edge at back side $B_K$ of knife 34. Head portion 40 is connected to and extends in a proximal direction along utensil axis $A_2$ from a distal end of neck portion 38 to form distal end $D_K$ of knife 34.

Accordingly, knife 34 is an example training utensil with intuitive design that constrains finger placement while holding the knife 34, thereby discouraging improper grip and facilitating proper usage of the utensil. With this intuitive design, the shape and features of knife 34 itself guides user grip and operation of knife 34 to build appropriate habits as to etiquette of the use of the utensil. This intuitive design allows the user to learn proper cutlery usage and etiquette for themselves, thereby reducing the burden of teaching this skill.

Figure 3A:
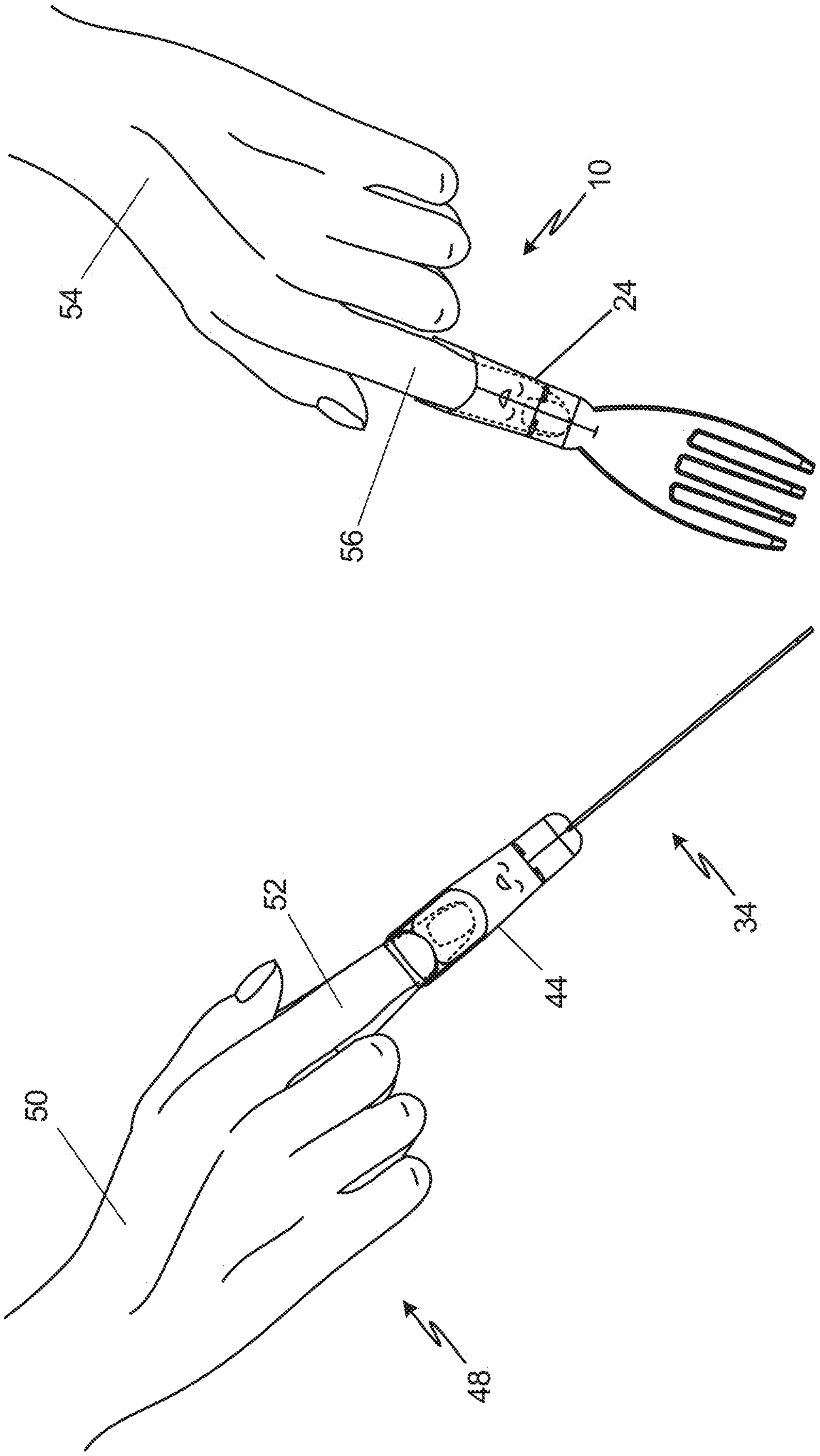
FIG. 3A is a perspective view of the fork utensil and the knife utensil being used in the Continental fashion.
Figure 3B:
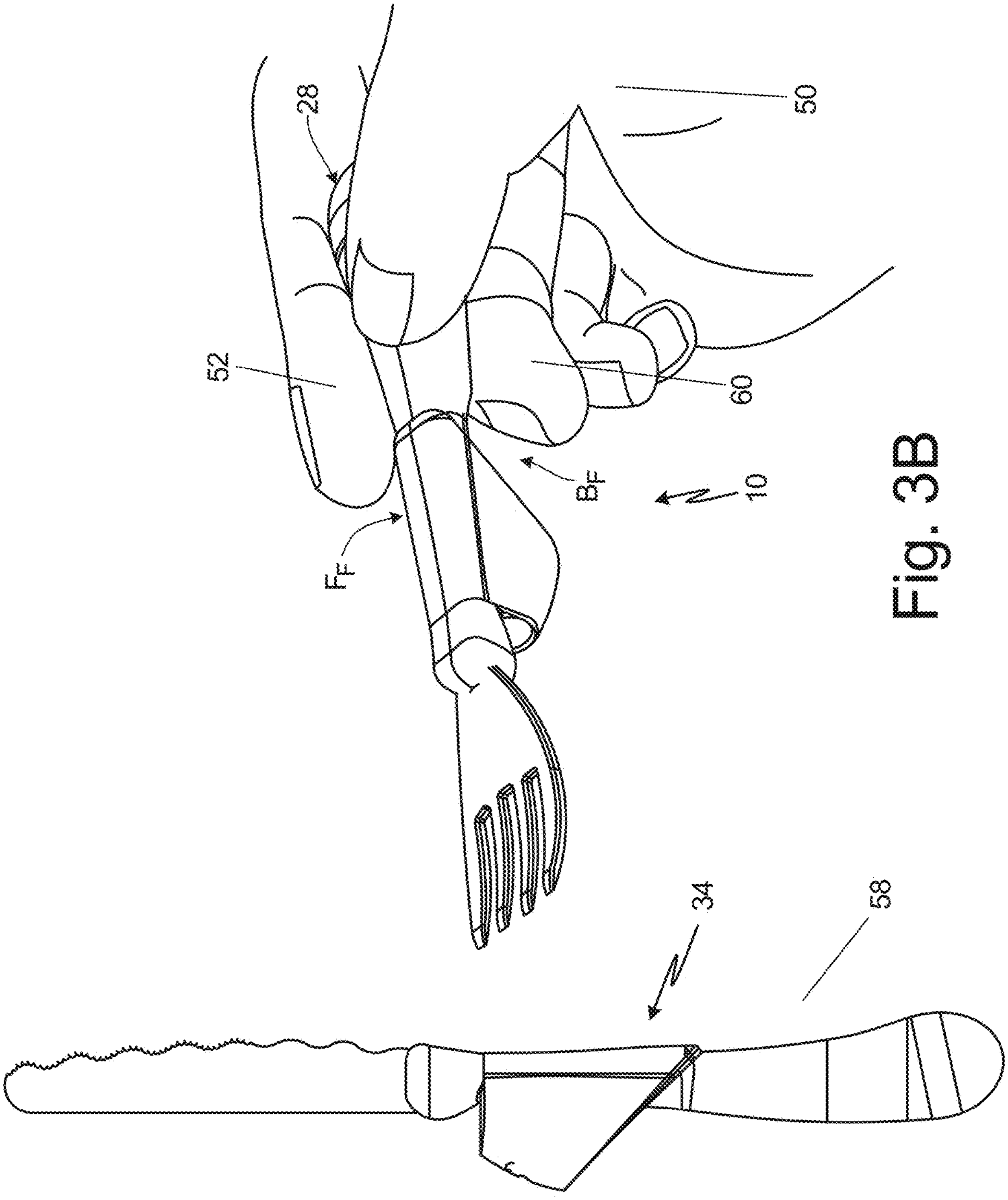
FIG. 3B is a perspective view of the fork utensil and the knife utensil being used in the American fashion.

FIG. 3A is a perspective view of fork 10 and knife 34 being used in a Continental fashion of etiquette. FIG. 3B is a perspective view of fork 10 and knife 34 being used in an American fashion of etiquette. FIGS. 3A and 3B are discussed together.

FIG. 3A illustrates utensil usage according to the Continental fashion by reference to fork 10, knife 34, and user 48. A dominant hand 50, dominant hand index finger 52, non-dominant hand 54, and non-dominant hand index finger 56 of user 48 are depicted in FIG. 3A. FIG. 3B illustrates utensil usage according to the American fashion by reference to fork 10, knife 50, and plate 58. Dominant hand 50, dominant hand index finger 52, and dominant hand middle finger 60 of user 48 are depicted in FIG. 3B.

American and Continental fashions for cutlery usage differ as described above. According to both the Continental and American fashion, knife 34 is held in dominant hand 50 and fork 10 is held in non-dominant hand 54 while cutting. In the Continental fashion, knife 34 is also held in dominant hand 50 and fork 10 is held in non-dominant hand 54 while eating. By contrast, according to the American fashion of etiquette, when user 48 is eating, knife 34 is placed on plate 58 and fork 10 is inverted and picked up by dominant hand 50.

In the Continental fashion of eating and cutting, dominant hand index finger 52 of dominant hand 50 of user 48 is placed into finger receptacle 44 of knife 34. This properly aligns dominant hand 50 of user 48 to use knife 34 in the correct manner. Further, when eating in the Continental fashion, non-dominant hand index finger 56 of non-dominant hand 54 of user 48 is placed into finger receptacle 24 of fork 10. This properly aligns non-dominant hand 54 of user 48 to use fork 10 in the correct manner. By properly aligning both hands of user 48, user 48 will intuitively know how to use both fork 10 and knife 34 with minimal instruction. These hand placements do not change for cutting in the Continental fashion.

In the American fashion of etiquette, index finger 52 of dominant hand 50 of user 48 is placed on front side $F_F$ opposite recessed portion 28. Dominant hand middle finger 60 of dominant hand 50 of user 48 is placed on recessed portion 28 on back side $B_F$ of fork 10. Dominant hand middle finger 60 rests within recessed portion 28 when in use during eating, which is a natural placement for user 48 due to the intuitive design of fork 10. Together, these finger placements encourage dominant hand 50 to be in the correct position and thus utilize fork 10 properly with minimal instruction.

In contrast to eating in the American fashion, cutting in the American fashion uses the same utensil grip as both eating and cutting in the Continental fashion. That is, dominant hand index finger 52 of dominant hand 50 of user 48 is placed into finger receptacle 44 of knife 34 and non-dominant hand index finger 56 of non-dominant hand 54 of user 48 is placed into finger receptacle 24 of fork 10. In an alternative example, fork 10 can be used by dominant hand 50 and knife 34 can be used by non-dominant hand 54. While this is not the traditional placement for knife 34 and fork 10 in either the Continental or American fashion, the shape of fork 10 and knife 34 does not preclude such usage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A utensil comprising:

a handle extending along a utensil axis from a proximal end of the utensil, the handle comprising:

a grip portion extending in a first axial direction along the utensil axis from the proximal end;

a neck portion extending in the first axial direction from the grip;

a finger receptacle disposed on a back side of the utensil and in the neck portion, the finger receptacle at least partially defining a passage extending between an entry opening oriented toward the proximal end of the utensil and an exit opening oriented toward a distal end of the utensil opposite the proximal end, wherein the passage is configured to receive and circumscribe a tip of a finger of a hand holding the handle;

a recessed portion on the back side of the utensil configured to accommodate a finger of the user when eating in an American Fashion; and a finger stop on the back side of the utensil, the finger stop disposed on an opposite axial side of the finger receptacle from the grip; and a head portion extending in the first axial direction from the neck portion such that the finger stop is disposed axially between the finger receptacle and the head portion, the head portion configured to engage food, and wherein the head portion comprises a plurality of tines, each tine of the plurality of tines extending in the first axial direction from a root to a point.

2. The utensil of claim 1, wherein the finger stop is disposed immediately adjacent to the exit opening of the finger receptacle.

3. The utensil of claim 2, wherein the head portion is disposed immediately adjacent to the finger stop.

4. The utensil of claim 1, wherein the finger stop projects radially outward to at least partially radially overlap the exit opening.

5. The utensil of claim 4, wherein the finger stop projects radially outward to radially overlap at least half of the exit opening.

6. The utensil of 1, wherein the finger receptacle is frustoconical in shape.

7. The utensil of claim 6, wherein an area of the entry opening is greater than an area of the exit opening.

8. The utensil of claim 1, wherein each of the plurality of tines curves concavely toward the front side of the fork.

9. The utensil of claim 1, wherein the root connects each of the plurality of tines; and wherein the root is disposed immediately adjacent to a distal side of the finger stop.

10. The utensil of claim 1, wherein the recessed portion comprises a depression formed in the back side of the handle, the depression defined by a first shoulder and a second shoulder.

11. The utensil of claim 10, wherein the second shoulder is formed in the handle in a distal direction from the first shoulder.

12. The utensil of claim 11, wherein an axial length from the first shoulder to the second shoulder is configured to accommodate a width of a finger of the user.

13. The utensil of claim 11, wherein the first shoulder is formed in the grip portion of the handle; and wherein the second shoulder is formed in the neck portion of the handle, such that the recessed portion straddles an interface of the grip portion and the neck portion of the handle.

14. The utensil of claim 11, wherein the second shoulder is formed adjacent to the entry opening defined by the finger receptacle.

15. The utensil of claim 1, wherein the entry opening defined by the finger receptacle is slanted in the first axial direction toward the distal end of the utensil.

16. The utensil of claim 15, wherein the entry opening defined by the finger receptacle is perpendicular to the utensil axis.

17. The utensil of claim 16, wherein the grip portion tapers in both width and height in the first axial direction to the neck portion from a location of maximum width and a location of maximum height of the grip portion.

* * * * *